Nov. 26, 1940.  J. R. GAMMETER  2,223,019
APPARATUS FOR MAKING PLAYING BALL CENTERS
Filed Dec. 9, 1937  4 Sheets-Sheet 1

Inventor
JOHN R. GAMMETER

By

Attorney

Nov. 26, 1940.   J. R. GAMMETER   2,223,019
APPARATUS FOR MAKING PLAYING BALL CENTERS
Filed Dec. 9, 1937   4 Sheets-Sheet 2
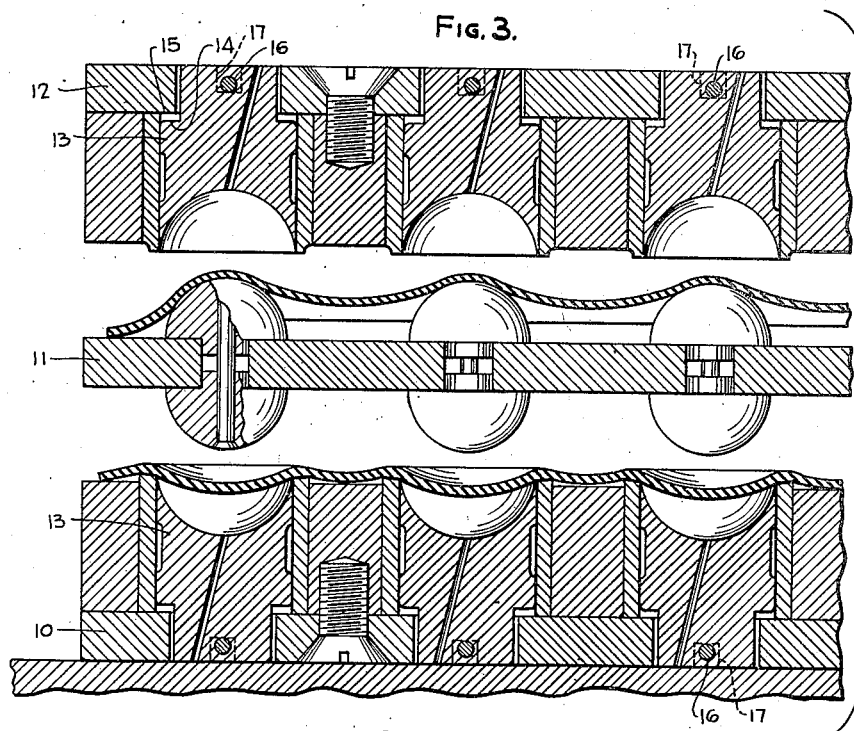
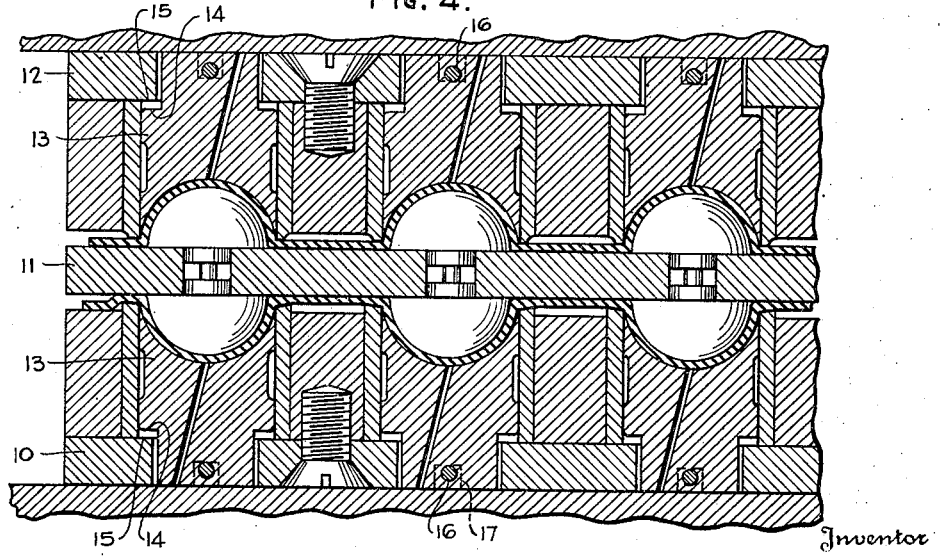
Inventor
JOHN R. GAMMETER Inventor
JOHN R. GAMMETER Nov. 26, 1940.   J. R. GAMMETER   2,223,019
APPARATUS FOR MAKING PLAYING BALL CENTERS
Filed Dec. 9, 1937   4 Sheets-Sheet 4

Inventor
JOHN R. GAMMETER

Patented Nov. 26, 1940

2,223,019

UNITED STATES PATENT OFFICE 2,223,019

APPARATUS FOR MAKING PLAYING BALL CENTERS

John R. Gammeter, Akron, Ohio, assignor to General Sports, Inc., Chicago, Ill., a corporation of Delaware Application December 9, 1937, Serial No. 178,915

1 Claim. (Cl. 18—35)

This invention relates to apparatus for making playing ball centers, such as liquid centers for golf balls.

Heretofore, playing ball centers filled with liquids have been made by first making hollow rubber balls and then injecting the liquid therein with an injector needle, self-sealing rubber being used to close the needle opening upon its removal.

The general purpose of the present invention is to provide a procedure and apparatus whereby such liquid centers may be made by incorporating the liquid or incompressible fluid into the hollow rubber or like balls during the course of manufacture of said balls.

The foregoing and other purposes of the invention are attained by the method and apparatus illustrated in the accompanying drawings and described below. It is to be understood that the invention is not limited to the specific procedure and apparatus shown and described.

Of the accompanying drawings:

Figure 3 is an enlarged sectional view of the mold as used for shaping sheets of rubber with the mold parts shown separated for sake of illustration.

Figure 4 is a similar view of the closed mold.

Figure 1:
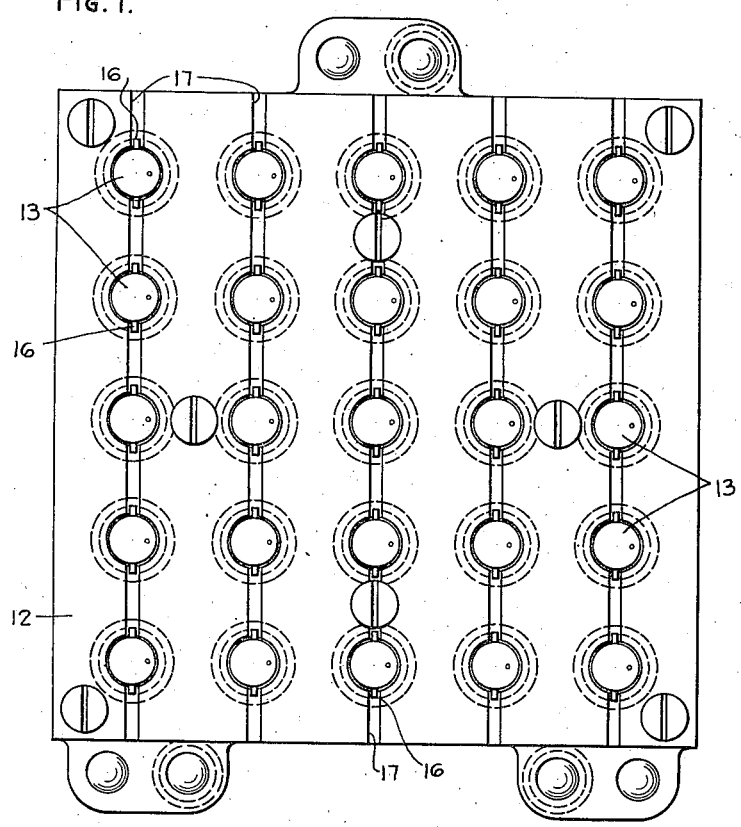
Figure 1 is a plan view of a ball mold embodying the invention.
Figure 2:
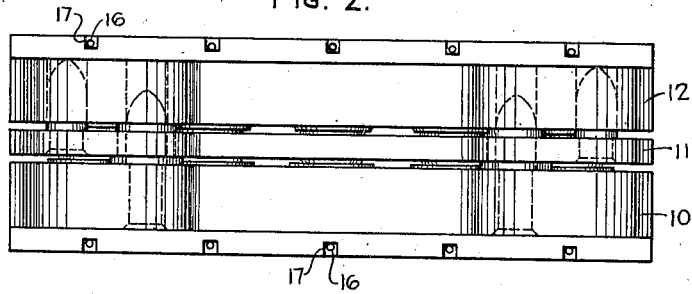
Figure 2 is a front edge elevation thereof.

Referring to the drawings, the numeral 10 designates the lower section, 11 the upper section and 12 the intermediate section of a hollow-ball mold of a type which is generally known but modified in structure for purposes of the present invention.

The modification consists essentially in providing the usual mold cavities in shiftable cavity members 13, 13 which are adapted to have a limited travel in bores in the mold sections 10 and 11, the cavity members 13 having shoulders 14 thereon adapted to engage shoulders 15 in the bores to limit shifting of the cavity members in one direction, pins 16, 16 on said cavity members and engaged in grooves 17, 17 being provided to limit shifting of the cavity members 13 in the other direction. Pins 16 prevent the cavity members 13 from shifting past the faces of the mold parts 10 and 11; shoulders 15 limit movement thereof out of the mold backs.

Figures 1, 2, 3 and 4 show the standard method of shaping plastic sheet rubber in a mold such as that shown to provide hemispherical ball portions of plastic rubber. Mold parts 10 and 11 are usually warmed and mold part 12 left cold for this operation. The mold parts are pressed together in a suitable platen press. The molds are then separated and mold part 12 removed. This is all standard practice and need not be described in detail in this specification.

Figure 5:
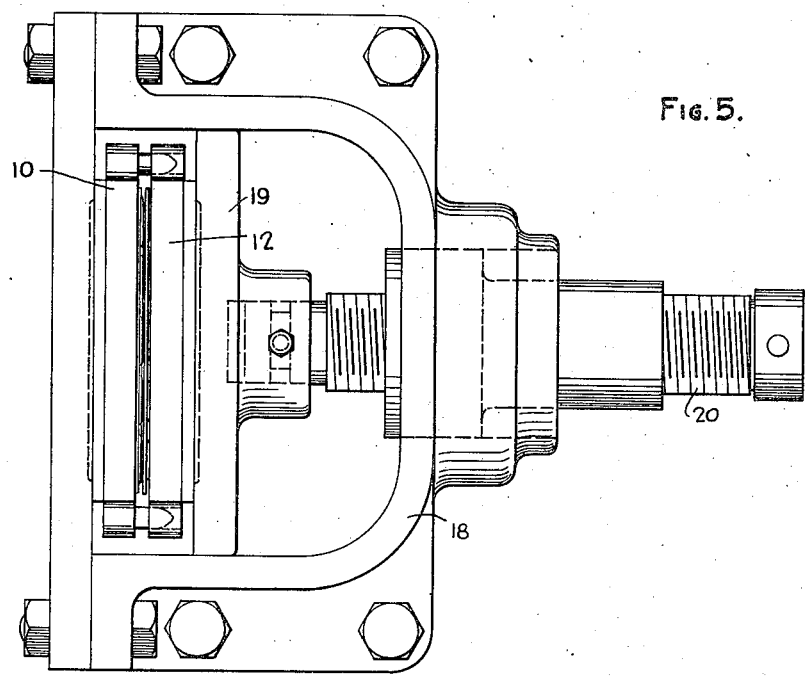
Figure 5 is a top plan view of a liquid ball-center press.
Figure 6:
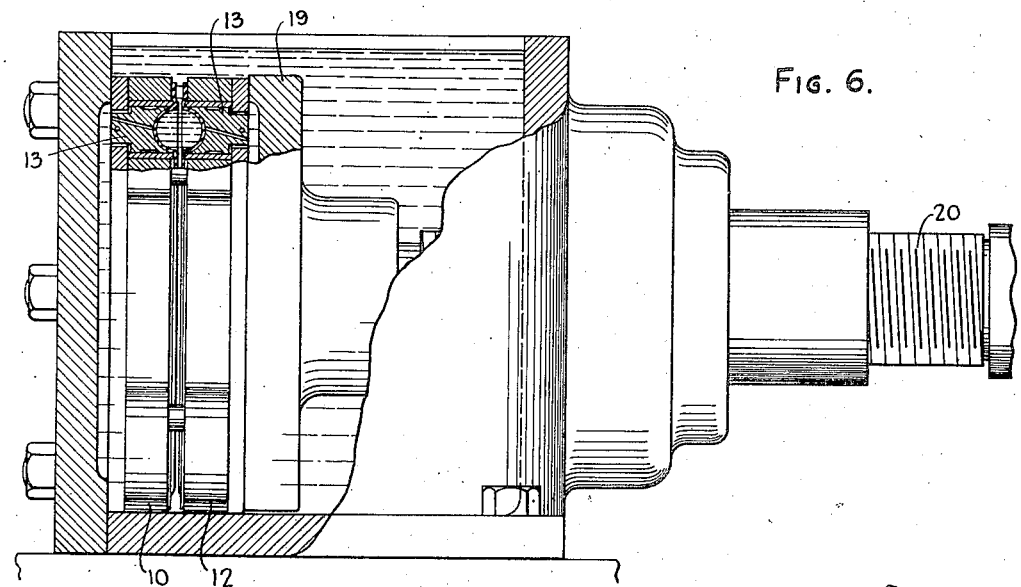
Figure 6 is an elevation thereof partly in section.
Figure 7:
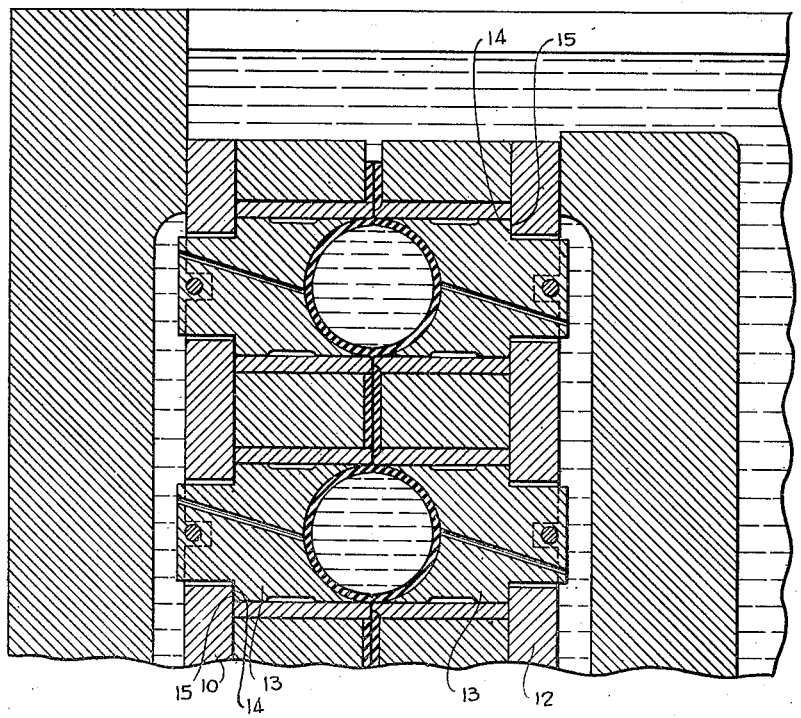
Figure 7 is an enlarged sectional view similar to Figure 6 showing the press closed to form the ball-centers.

For carrying out the present invention, a ball press is provided as illustrated in Figures 5 and 6. This comprises a suitable vessel 18 which may be open at the top into which mold 10—11 may be placed edge-wise, as shown with the mold members slightly separated, and in the vessel 18 there is arranged a press member 19 which may be operable by a screw 20 to press mold parts 10 and 11 together as shown in Figure 7.

The molds 10 and 11 are designed as shown and as will be understood by skilled artisans to pinch the sheets of plastic rubber together and cut them off about the mold cavities to form hollow rubber balls. The liquid for the centers being in vessel 18 and portions being confined between the molds in the hollow balls thus formed is incompressible. Hence, to perform this pinching operation effectively after the liquid has become confined and to form perfect balls without distortion, it is necessary to allow the cavity members 13 to be depressed relative to the mold faces which they do to an extent during the final pinching operations as has been illustrated in Figure 7.

Figure 8:
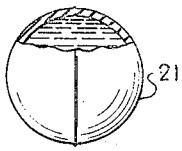
Figure 8 is an elevation partly in section of a finished ball center.

The mold 10—11 is now removed from vessel 18 and the parts thereof separated and finished ball-centers 21 are removed therefrom. The ball-centers may be vulcanized in mold 10—11 or after removal from said mold. Such a ball-center is shown in Figure 8 and may be incorporated in a ball structure in any suitable way.

Modifications of the invention may be resorted to without departing from the spirit thereof or the scope of the appended claims.

What is claimed is:

A hollow ball mold for the purpose described having registering mold sections each containing one or more cavity members therein, shiftable with respect to the mold sections, a chamber for a liquid in which said mold sections may be submerged, and means for shifting said mold sections into mating cooperation with each other, said cavity members being relatively shiftable in the mold sections after the latter have moved into cooperation to compensate for the incompressibility of a liquid enclosed in said cavity members when the mold sections are moved into cooperation.

JOHN R. GAMMETER.